March 13, 1962 R. CHARCUSET ETAL 3,024,857
DEVICE FOR FILLING CONTAINERS WITH PREDETERMINED
QUANTITIES OF MATERIALS
Filed Jan. 27, 1959 2 Sheets-Sheet 1
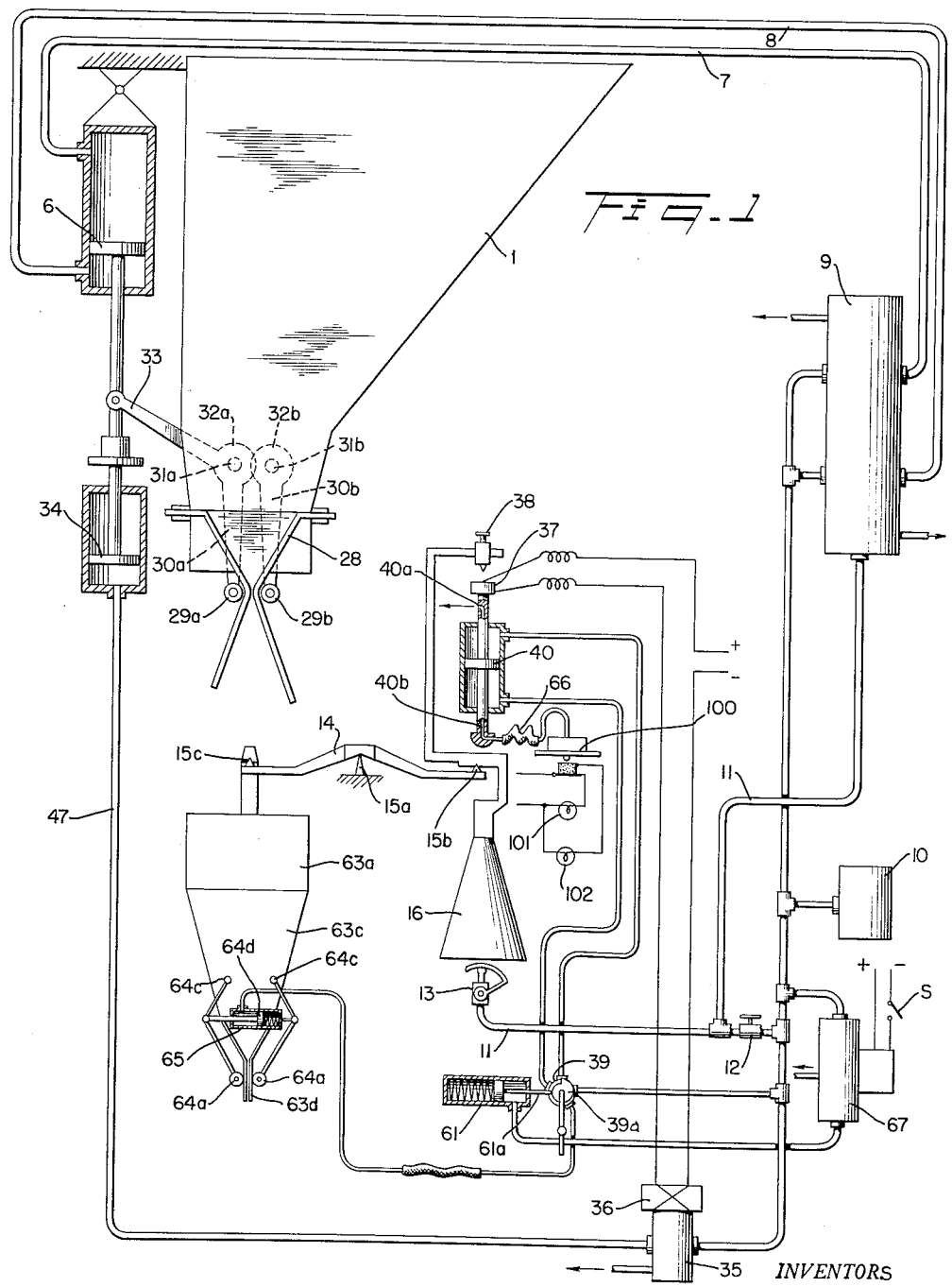
INVENTORS
JEAN MOYRAND
RAYMOND CHARCUSET
BY *Bauer and Seymour*
ATTORNEYS March 13, 1962 R. CHARCUSET ETAL 3,024,857
DEVICE FOR FILLING CONTAINERS WITH PREDETERMINED
QUANTITIES OF MATERIALS
Filed Jan. 27, 1959
2 Sheets-Sheet 2
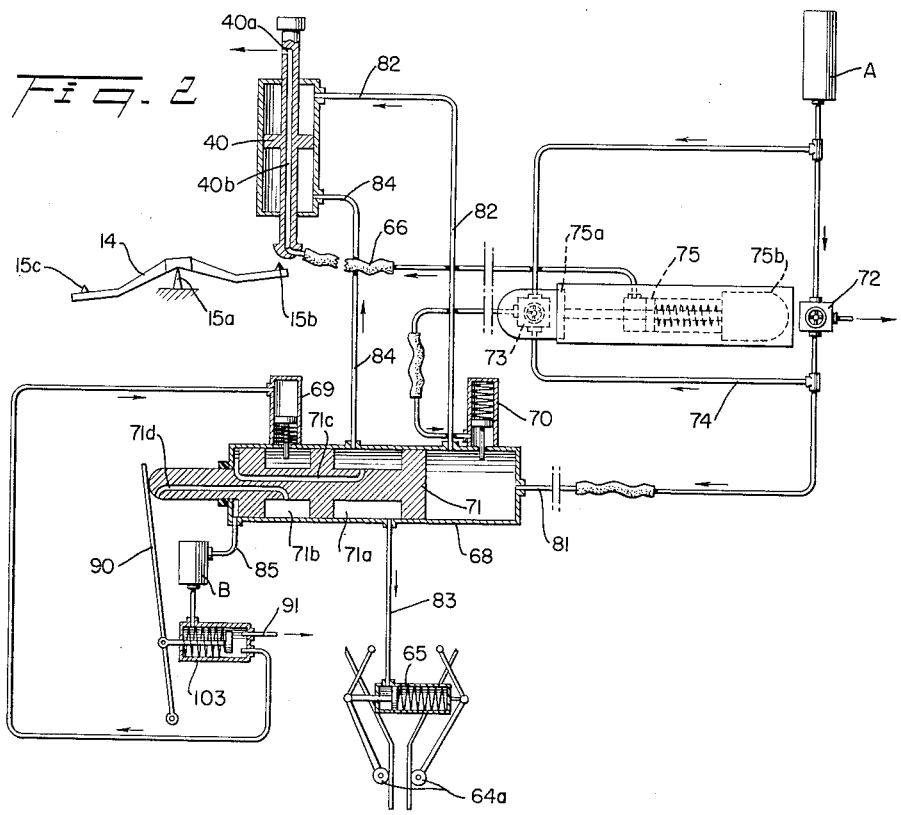
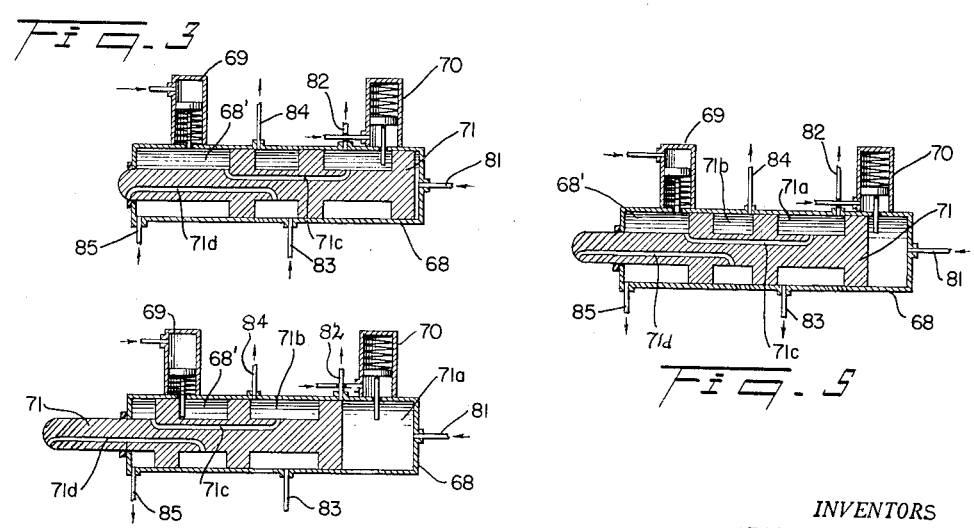
INVENTORS
JEAN MOYRAND
BY RAYMOND CHARCUSET
Bauer and Seymour
ATTORNEYS

3,024,857
DEVICE FOR FILLING CONTAINERS WITH PRE-DETERMINED QUANTITIES OF MATERIALS

Raymond Charcuset, Chauny, and Jean Moyrand, Vaucresson, France, assignors to Compagnie de Saint-Gobain, Paris, France
Filed Jan. 27, 1959, Ser. No. 789,345
7 Claims. (Cl. 177—71)

This invention relates to a device for delivering and weighing given quantities of granular or powdered materials.

The present application is a continuation-in-part of application Serial No. 603,919, filed August 14, 1956, now Patent No. 2,931,614, issued April 5, 1960.

The device in accordance with the present invention comprises a hopper provided with a closing arrangement, with a weighing arm provided at one of its extremities with a weight carrying mechanism and, at the other, with an intermediate container or hopper having a selectively operated closing arrangement at its lower end. The weight carrying mechanism is operated automatically by means of compressed air or fluid under the control of a valve which in turn is controlled by the movement of a weighing arm in such manner that the hopper-closing means is closed when the arm lies in a position of equilibrium, that is, a position corresponding to the introduction into the intermediate container of a predetermined desired load of material.

The apparatus of the present invention incorporates a number of improvements over that disclosed in the above application which permit its operation in a somewhat more flexible manner, and, if desired, by an operator positioned at a distance from the weighing apparatus. Among such improvements is the use of an intermediate container rather than a sack holder at the end of the weighing arm opposite from that carrying the weight. Such intermediate container, which has a construction enabling it to store and freely discharge powdered or granular materials without packing, allows the apparatus to weigh at one time a quantity of material far in excess of that which would fill an ordinary sack or bag. Such arrangement also allows the more rapid discharge and weighing of material by the apparatus as a whole, and a more rapid discharge of weighed material from the intermediate container into, for example, a bin or the like.

The apparatus of the present invention also includes improved signalling means whereby the operator is continuously informed whether the device is at rest or is engaged in a weighing operation, and further includes improved control means whereby the operation of a device is simplified and rendered more positive. The second embodiment of such control means thereof disclosed herein is particularly adapted for controlling the weighing apparatus from a distance so that, for example, the operator may safely divide his attention between the weighing apparatus and some other apparatus which he tends.

The invention has among its objects the provision of a novel weighing apparatus of the type described including an intermediate container or hopper in which the material is weighed.

A further object of the invention lies in the provision, in weighing apparatus of the type described, of improved signalling means whereby the operator is continuously informed of the condition of the apparatus, that is, whether it is at rest or is engaged in a weighing operation.

Yet another object of the invention lies in the provision of improved control means for the weighing apparatus whereby control of the weighing operation and discharge of the weighed material from the intermediate container are rendered simpler and more positive.

A still further object of the invention, in a preferred embodiment thereof, lies in the provision of improved control mechanism for the weighing apparatus, the operator-controlled elements of which may be situated at a distance from the weighing apparatus while still assuring positive and safe control of the weighing apparatus.

Yet another object of the invention lies in the provision, in the improved control mechanism of the invention, of selectively operated safety means which prevents the operation of all but the control element which should next be operated during the cycle of the weighing apparatus.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views:

FIG. 1 is a schematic view in section of a fully automatic material weighing apparatus including the intermediate container of the invention, such apparatus incorporating a first disclosed embodiment of the control mechanism of the invention;

FIG. 2 is a somewhat schematic fragmentary view in vertical section of a second embodiment of control mechanism of the weighing apparatus of the invention, the control mechanism being shown with the elements thereof in the positions which they assume at the start of a weighing operation;

FIGS. 3, 4, and 5 are somewhat schematic views in vertical section through the pneumatic distributor valve of the control mechanism of FIG. 2, such pneumatic distributor being shown in the successive positions it assumes in the course of a material weighing cycle.

In FIG. 1, 1 represents a material-delivering hopper which is selectively closed at the bottom thereof by a flexible hose or sleeve 28, which may, for instance, be made of rubber, and which may be pressed inwardly so as to be closed or strangled by rollers 29a, and 29b, which are controlled by levers 30a and 30b, mounted to rotate about axis 31a, and 31b, respectively. Simultaneous closing or opening motion of levers 30a and 30b is effected by means of meshing part-gears 32a, 32b, gear 32a being part of a lever 33 controlled by a double acting piston 6. Piston 6 is connected to a control valve 9 by ducts 7 and 8. Valve 9 may, in one position of its movable valve element (not shown), direct air under pressure from a compressor 10 into duct 7 and simultaneously connect duct 8 to the atmosphere. In the other position, the valve directs air into duct 8 and directs duct 7 to the atmosphere. The described shifting of movable element of valve 9 is caused by selectively admitting compressed air into conduit 11 by opening valve 12, which lifts the movable element of valve 9, and connecting duct 11 to the atmosphere by means of weighed valve 13 which causes said movable element of valve 9 to descend under the action of gravity. Valve 13 is closed when pressed forcibly downwardly by weight 16, but is open at other times.

The downward movement of piston 6 is limited by the opposing separate piston rod of piston 34 which descends when the lower end of the cylinder is connected to the atmosphere. Piston 34 is raised when the lower end of the cylinder is connected with compressed air through the conduct 47 by means of a valve 35, controlled by an electromagnet 36. Valve 35 is closed, thereby cutting off air under pressure from pipe 47, when electromagnet 36 is energized, and is open when the electromagnet is deenergized. The movement of the electromagnet 36 is controlled by a normally closed switch 37, the switch being opened by an adjustable stop 38 which is part of the weight carrying arrangement 16. The weighing arm 14, which is diagrammatically shown herein, may, for example, be of the same construction as that shown and described in application Serial No. 603,919. Arm 14 has the parallel longitudinal members thereof resting upon two central fulcrums on axis 15a. The arm 14 is provided with terminal supports, on the weight carrying end thereof on line 15b, and with terminal supports on line 15c on which the mechanism supporting the intermediate container rests.

It will be understood that the weighing arm 14 preferably includes mechanism such as that shown in FIG. 2 of application Serial No. 603,919, whereby the conduit leading to the valve closing cylinder or cylinders 65 from valve 39, to be described, is connected to the weighing arm without adding to the effective weight or retarding torque applied in either direction to the arm.

The intermediate container in accordance with the invention includes a rigid wall hollow-cylindrical portion 63a positioned at the upper end thereof and a lower, downwardly converging frusto conical portion 63c connected to the lower end of portion 63a. The shape of portion 63c allows the powdered or granular material therein to flow freely despite the weight thereabove of material in upper portion 63a. The lower end of portion 63c is provided with a closure mechanism made up of a sleeve of flexible sheet material such as a sleeve 63d of flexible sheet material such as rubber or plastic material which may be closed or strangled by opposed presser rollers 64a mounted on arms pivoted to hopper portion 63c by pivot pins 64c.

In the embodiment shown, the presser rollers 64a are actuated by floating pneumatic pistons in cylinders, one piston 64d and one cylinder 65 being shown, each cylinder including a coil compression spring acting between the piston and an end of the cylinder in such manner as to urge the presser rollers 64a toward their open position. The side of the piston not engaged by the coil compression spring is selectively subjected to pneumatic pressure fed thereto through conduit means such as that shown in FIG. 2 of the parent application, such conduit means being supplied with compressed air through a conduit, which is preferably flexible, extending from valve 39.

Valve 39 in the embodiment shown is a four-port valve provided with a rotatable valve element. Valve 39 permits the simultaneous feeding of air to cylinders 65 of the closure means for the intermediate container and to the lower part of a weighing arm-locking piston 40. Piston 40 is located above the weight-carrying arrangement 16, and functions to lock weighing arm 14 when such piston lies in its lower position and to release the arm 14 when the piston occupies its upper position. In another position, the valve 39 connects cylinders 65 of the closure means for the intermediate container to fluid pressure, thereby opening the closure, and concurrently feeds compressed air to the upper part of piston 40 and connects the lower part of piston 40 to the atmosphere, thereby lowering the piston 40 and its piston rod and thus locking arm 14 with weight-carrying device 16 in the lowered position.

The rotatable operating spindle of valve 39 is provided with a stepped cam 39a, the step of which selectively cooperates with a locking pin 61a affixed to a piston in a cylinder 61. A coil compression spring is positioned in the cylinder 61 to engage the face of the piston therein opposite from that carrying the locking pin 61a, so as constantly to urge the locking pin toward valve 39, that is, in a valve locking direction. The forward end of cylinder 61 is selectively subjected to pneumatic pressure through a three-port electromagnetic valve 67 which is connected to the source of pneumatic pressure leading from valve 9, valve 67 being under the control of switch S. In the embodiment shown the cam plate 39a is so affixed to the spindle of valve 39 that the shoulder on the cam plate faces counterclockwise and lies diametrically opposite from the operating handle for the valve.

In accordance with the present invention, the piston rod carrying piston 40 has a central duct 40b therethrough extending from adjacent its bottom end to a position adjacent its upper end where it communicates with a lateral opening 40a which communicates with the atmosphere when the piston rod is raised. The lower end of duct 40b is connected by a flexible conduit indicated at 66 to a pneumatically operated electro contactor 100 which actuates, respectively, the signal lights 101 and 102 which may be, for example, green and red. It will be seen that when piston 40 is elevated as shown, the contactor 100 is subjected to atmospheric pressure, and that when it is lowered to bring orifice 40a within the locking cylinder, it is subjected to the higher pressure within the locking cylinder. Contactor 100 is so constructed that green light 101 is lighted when piston 40 is lowered to lock the weighing arm 14, and that red light 102 is lightened when piston 40 is elevated, as during the course of a weighing operation.

The operation of the device thus far described is as follows: FIG. 1 shows the positions of the different components of the apparatus at the end of a material delivering and weighing operation. Equilibrium has been achieved, that is, arm 14 lies horizontal, the intermediate container contains sufficient material to balance weight 16, the closure means 64a, 64a at the bottom of the intermediate container are closed, and the pistons 6 and 34 are in their lowered positions. Piston 40 is still in its raised position, and the red light 102 is lighted. Weight 16 will now be removed from valve 13 sufficiently to connect conduit 11 to the atmosphere, thereby causing the movable element in valve 9 to descend and causing the piston 6 to descend to close the closure means at the bottom of hopper 1.

After the apparatus has achieved the position of FIG. 1, the operator turns the handle of valve 39 90° counterclockwise to bring the step of cam 39a into locking engagement with the forward end of pin 61a, which is then held in its right hand terminal position by the spring in cylinder 61. This subjects the upper face of locking piston 40 to pressure, and connects the lower face of piston 40 to the atmosphere. The piston 40 thus descends and thereby causes the weighing arm 14 to be locked with the intermediate container side lifted and with the weight carrying arrangement lowered. Green light 101 is now lighted and red light 102 extinguished. Weight 16 then rests on valve 13, thereby closing such valve. The operator then closes switch S, thereby actuating valve 67 to subject the forward end of cylinder 61 to pressure and retracting locking pin 61a from cam plate 39a of valve 39. The operator then turns valve 39 another 90° counterclockwise. Cylinders 65 are then connected to the atmosphere and the springs in such cylinders cause the closure rollers 64a, 64a at the lower end of the intermediate container to open thereby allowing the contents to flow therefrom.

To start a weighing operation, the operator turns valve 39 through 180° in a clockwise direction. This causes the rollers 64a, 64a of the closure means on the intermediate container to be closed. Concurrently, compressed air is sent back to the lower face of piston 40 which rises, thus freeing the weighing arm 14 and causing contact 37 to engage stop 38. This last action cuts the electric power to the electromagnet 36, thereby allowing the movable element of valve 35 to fall, opening the valve and initiating the flow of air to pipe 47, thus causing the lower face of the piston 34. The piston 34 is thus raised. By briefly opening valve 12, the operator places duct 11 under pressure, duct 11 being closed, as we have noted, by valve 13 which is held closed by the resting of weight carrying arrangement 16 upon it. The result is that the valve 9 releases piston 6 for upward travel. The latter is accordingly pushed upwards by piston 34 so as completely to open the flexible sleeve 28 of the closure means on hopper 1, thereby allowing rapid flow of the material in hopper 1 into the intermediate container.

As the intermediate container fills, the pressure of the weight carrying arrangement on valve 13 decreases. At a given moment, when the intermediate container holds a weight of material slightly less than the desired weight, the spring (not shown) of valve 13 overcomes the force exerted by means 16 and the valve 13 then rises slightly, connecting duct 11 to the atmosphere. This allows the movable element of valve 9 to descend, and valve 9 in turn lowers piston 6. Before piston 6 reaches its lowest position, its piston rod encounters the end of the separate piston rod of opposing piston 34, which is then in a raised position. This causes the pressure rollers 29a and 29b to close sleeve 28 in completely to form a partial aperture, permitting material in hopper 1 to keep flowing slowly into the intermediate container. This partial aperture through sleeve 28 may be adjusted as required by the flow characteristics of the material to be weighed and to the precision required in the weighing, by adjusting the effective length of the rod of the piston 6 as by means of a threaded connection (not shown) between the head on such piston rod and the piston rod proper.

The weight of the delivered material accumulated in the intermediate container finally equals the weight of which the device is adjusted, and the weighing arm 14 reaches its position of equilibrium. This movement, which lifts the weight carrying arrangement 16, concurrently lifts stop 38 out of engagement with switch 37. Switch 37 then closes the feeding circuit for electromagnet 36, the movable element of valve 35 is lifted and pressure is released from piston 34. The latter descends, leaving piston 6, still under pressure, to descend quickly to its lowest position, which corresponds to the total closure of the sleeve 28. The intermediate container then contains the desired quantity of material, and the cycle, beginning with the lowering of piston 40 to lock the weighing arm 14, may begin once more.

The second embodiment of the invention, shown in FIGS. 2 to 5, inclusive, is particularly advantageous for applications wherein the operator is positioned at a considerable distance from the weighing apparatus. Generally, in the apparatus of FIGS. 2 to 5, inclusive, the valve 39 and its control means in the embodiment of FIG. 1 are replaced by a pneumatic distributor which may be operated for example by push button means located at a distance. The pneumatic distributor of the second embodiment coacts with the parts of the weighing apparatus, including the locking piston 40 for the weighing arm and the means for operating the pressure rollers 64a of the closure means for the intermediate container, in the manner indicated in FIG. 2. Parts of the weighing apparatus of FIGS. 2 to 5, inclusive, which are the same as those of FIG. 1 are designated by the same reference characters.

The pneumatic distributor includes a cylinder 68 provided with five ports, 81 to 85, inclusive, and two pneumatic locking means 69 and 70. Within cylinder 68 there is positioned a longitudinally reciprocable piston 71 having shoulders which define the limits of two intermediate chambers 71a and 71b. Two sources of fluid pressure, A and B, are provided. The chamber 71a is fed with the fluid under pressure from source B through an orifice 85 by means of a passage 71c passing through a part of the body of the piston, and distributes such fluid under pressure to orifices 82, 83, and 84, depending upon the position of piston 71 in cylinder 68. The chamber 71b, in the position of the piston 71 shown in FIG. 3, connects orifices 83 and 84 to the atmosphere by means of passage 71d extending through the nose portion of the body of piston 71. In the terminal position of piston 71 at which it lies furthest to the left, the nose of piston 71, which extends outwardly through a sealing means at the left hand end of cylinder 68, will have abutted and turned somewhat counterclockwise an operating lever 90 of a clapper-type valve 103.

The pneumatic distributor is controlled by two valves: a valve 72 which distributes fluid under pressure from source A to orifice 81 of cylinder 68, so as to permit the initiation of the weighing operation, and a three port valve 73 which permits the unlocking of latching means 70 when the weighing operation is finished, thereby allowing the emptying of the intermediate container of the weighing apparatus. The various steps in the functioning of the control apparatus during the weighing cycle thereof are described below.

FIG. 3 shows the pneumatic distributor in the position which it assumes when the weighing apparatus is in the at rest position (that is to say, when the intermediate container is empty and the presser rollers 64a are open). It will be seen that under the action of their compression springs the latching means 69 is retracted when the latching means 70 is advanced. It will also be seen that the piston 71 occupies its right hand terminal position in cylinder 68 by reason of fluid pressure delivered to port 85 of the distributor from fluid pressure source B. The pressure thus communicated from source B through port 85 communicates through passage 71c with chamber 71a from which it passes to orifice 82, thereby subjecting the upper face of piston 40 to pressure to impel it into its lowermost position. It will also be seen that chamber 71b of the pneumatic distributor connects port 83 to the atmosphere, thereby allowing the springs within cylinders 65 to open pressure rollers 64a. The port 84 of distributor 68 is also connected to the atmosphere whereby the lower face of piston 40 is connected to the atmosphere.

When the operator operates valve 72, as by pressing a push button connected thereto, fluid under pressure is distributed by conduit 74 to valve 73 and is transmitted to the underside of the piston in pneumatic latching means 70 so as to retract such latching means. Simultaneously piston 71 is forced to the left in cylinder 68, since pressure transmitted through port 81 operates upon the total area on the right hand end of the piston whereas the counterpressure entering cylinder 68 through orifice 85 operates upon only an annular portion of the surface of the piston at the base of the nose on the piston. At the end of the period of travel of piston 71, the left hand nose portion of the piston abuts the lever 90 connected to a clapper-valve 103 which is connected to the source of compressed air B. The turning of lever 90 counter-clockwise and the retraction of the movable valve element in valve 103 to the left connects the upper end of the cylinder of pneumatic latching means 69 to the fluid pressure source B through valve 103. To allow such connection, the piston of the clapper valve 103 may, as shown, fit the sidewalls of the cylinder with substantial clearance. Although conduit 91 is opened when the piston of valve 103 is retracted, the passage in conduit 91 is of such small size that, in spite of the leakage of air from source B through conduit 91, the pressure in the pipe leading from valve 103 to cylinder 69 is sufficiently high to overcome the spring which biases the piston in such cylinder. Consequently, the spring in latching means 69 is overcome, allowing the latching pin thereof to project into chamber 71b to serve as an abutment to piston 71. Simultaneously, the pressure transmitted through port 83 closes the pressure rollers 64a and the pressure transmitted through port 84 raises piston 40 which frees the arm 14 of the weighing apparatus.

When the operator ceases to push the operating button of valve 72, the orifices 81 and 74 are connected to the atmosphere. This causes the advance of latching means 70 by its spring and the displacement to the right of piston 71 so that its shoulder abuts the pin of latching means 69. This position of the pneumatic distributor, which is shown in FIG. 4, continues during the active weighing operation of the cycle.

FIG. 5 shows the pneumatic distributor in the position it occupies when the weighing operation is finished. The latching means 69 will have been retracted by its spring upon the moving of piston 71 to the right, which allows the lever 90 to pivot clockwise under the influence of the spring in clapper valve 103. The piston of such clapper valve thus moves to the right, approaching contact with the ends of the pipes protruding into the right hand end of the clapper valve. During such movement of the piston in valve 103 the pressure of the air in the pipe leading to the cylinder 69 progressively decreases, so that the spring in cylinder 69 is able to raise or retract the piston in such cylinder into the position of FIG. 5 before the piston in clapper valve 103 reaches its right hand terminus of travel. Until such time, pipe 91 remains open to allow passage of air exhausted from cylinder 69 during the retraction of the piston in such cylinder. After the piston in cylinder 69 has been retracted as described, the piston 71 travels to the right so that its right hand end abuts the pin of latching means 70. In this position (FIG. 5), the port 84 is connected to the atmosphere and the port 82 is connected to fluid pressure, thereby causing the piston 40 to descend to lock the arm 14 of the weighing balance. The port 83, which is then place under pressure, maintains the presser rollers 64a in closed position.

To discharge the weighed material, the operator operates valve 73, as by pushing an operating button therefor, to connect the third port of 73 and thus 70 directly to source A via the pipe shown above 75, whereby to retract latching means 70. The piston 71 of the pneumatic distributor now travels into its right hand terminal position (FIG. 3) in which the port 83 is placed in communication with the atmosphere through passage 71d, thereby allowing the presser rollers 64a to open.

The safety device, which constitutes a part of the present invention, and which is now to be described, totally removes the possibility of error on the part of the operator as to the sequence of operations which he should perform. Such safety means is composed of slidable screens or enclosures which selectively expose or mask the operating means, such as push buttons, for valves 72 and 73. Such screens or enclosures, which are designated respectively, 75a and 75b in FIG. 2, are there shown somewhat diagrammatically. A pneumatically operated means in the form of a cylinder having a reciprocable piston 75 therein has the left hand end thereof selectively fed with fluid under pressure or is placed in communication with the atmosphere. The piston 75 is constantly urged to the left (FIG. 2) by a coil compression spring, such spring being overcome and the piston thus thrust to the right when the piston is subjected to fluid pressure. This occurs when the piston 40 is lowered and the conduit 66 leading from the lower end of the piston rod thereof is subjected to pressure, the left hand end of piston 75 then being subjected, in the manner described, to pressure. The opposite ends of the piston rod of piston 75 are provided with masks or screens 75a and 75b, which selectively cooperate, respectively, with the operating means, such as push buttons, for valves 73 and 72.

The safety means of the invention operates as follows: During the active weighing operation of the apparatus, piston 40 lies near the top of the cylinder so that the orifice 40a at the top of the piston rod thereof communicates with the atmosphere. The piston 75 is, under such conditions, thrust to the left by its spring, and the mask or closure 75a functions to cover the operating means for valve 73 to prevent its operation. When the weighing operation is finished, that is to say, when piston 40 is thrust into its lowermost position, and orifice 40a lies within the cylinder containing the piston 40, the piston 75 is thrust to the right, thereby unmasking the operating means for valve 73 and covering the operating means for valve 72 and preventing the operation of the latter. It is to be understood that the pneumatic distributor and the improvements in the weighing apparatus described above may be used to advantage when the weighing apparatus does not incorporate the intermediate weighing container.

It is possible, in accordance with another aspect of the invention, to render automatic the release of a weighed sack of material, should the apparatus incorporate a sack holding means in accordance with application Serial No. 603,919 rather than the intermediate container disclosed herein, or the evacuation of the intermediate container in the apparatus above described. In such case, the conduit 66 may be connected to the pneumatic latching means 70 and the operator will operate only the push button for valve 72 to initiate the cycle of operations of the apparatus. It will be understood that such modification of the apparatus eliminates the above described safety device including the valve 73 and the conduit 74.

As many apparently widely different embodiments of the present invention may be made without departing from the spirit and scope thereof, it is to be understood that the invention is not limited to the specific embodiments shown.

What is claimed is:

1. Apparatus for filling a container with a predetermined weight of a fluent material, which comprises a pivoted weighing arm, a weight carrying device carried on one end of said arm, a fluent material holding means carried on the other end of said arm, a fluent material delivering conduit having a shutter device mounted above the fluent material holding means, means for moving the shutter between open and closed positions, a fluid system including a control valve for controlling the last named means, said fluid system including a bleeder valve controlling the position of the control valve, the apparatus being so constructed and arranged that the bleeder valve is closed to place the fluid system under pressure and the shutter device is open when the weighing arm is inclined downwardly toward the weight carrying device, and the bleeder valve is open to relieve the pressure in the fluid system and close the shutter device when the weighing arm lies in a position close to the horizontal, a closure means which may be selectively opened and closed on the bottom of the fluent material holding means, fluid pressure operated means for controlling the closure means for the material holding means, a fluid pressure operated weighing arm blocking means having a locking cylinder selectively to hold the weight carrying device in a downward position, means for simultaneously opening the closure member on the material holding means and locking the weighing arm, said last named means including a fluid pressure distributor located at a substantial distance from the weighing arm, said distributor including means for selectively directing fluid under pressure to the locking cylinder which locks the weighing arm, and to the means for closing the closure means for the fluent material holding means, and means for operating the distributor so as selectively to unlock the weighing arm and to open the closure means for the fluent material holding means.

2. The apparatus as set forth in claim 1, comprising an operating means for the distributor, and a safety device comprising a guard for selectively preventing operation of the operating means except at the correct times in the operating cycle of the weighing apparatus.

3. The apparatus as set forth in claim 1, comprising two operating means for the distributor, said two operating means being adapted for separate operation at different points in the operating cycle of the weighing apparatus, and a safety device comprising two guards, each associated with its respective operating means, for selectively preventing operation of the operating means except at the correct times in the operating cycle of the weighing apparatus.

4. The apparatus as set forth in claim 3, wherein the two guards are connected so that when one covers its operating means the other uncovers its operating means.

5. The apparatus as set forth in claim 1, wherein the weighing arm blocking means comprises a cylinder having a reciprocable arm-blocking piston and piston rod therein, and the distributor comprises a cylinder, a piston within the cylinder reciprocable longitudinally thereof, said piston having a first, a second, and a third longitudinally spaced shoulder thereon, said three shoulders forming with the cylinder two intermediate chambers sealed from each other, a first passage in the piston connecting a first intermediate chamber, between the first and second shoulders, to the atmosphere at all times, a second passage in the piston connecting at all times the first intermediate chamber to the other, second, intermediate chamber formed by the second and third shoulders, a first source of fluid pressure, means selectively to connect such first source of pressure to the first end space between the third shoulder and its confronting, first, end of the cylinder, a second source of fluid pressure, means to connect such second source of pressure to the second end space between the first shoulder and its confronting, second, end of the cylinder, a first and a second port in the side of the distributor cylinder connected to the respective ends of the weighing arm blocking cylinder, and a third port in the side of the distributor cylinder connected to the fluid pressure operated means for controlling the closure means for the material holding means.

6. The apparatus as set forth in claim 5, wherein the end of the piston of the distributor outwardly beyond the first shoulder has a reduced diameter central rod-like extension thereon protruding through and sealingly engaging the second end of the distributor cylinder, the first passage in the distributor piston extending through said rod-like extension, and a valve means operated by the rod-like extension on the distributor piston selectively to subject the first end space of the distributor cylinder to full pressure from the second source of pressure and markedly to reduce the pressure in said first end space.

7. The apparatus as set forth in claim 6, comprising two fluid pressure operated locking means spaced along the distributor cylinder, said locking means having locking pins selectively advanceable into the path of the distributor piston and retractable from such path, a first of such locking means being resiliently biased outwardly of the distributor cylinder, means selectively connecting the first locking means to the second source of pressure to advance its locking pin into the path of the distributor piston, the second of such locking means being resiliently biased inwardly of the distributor cylinder, and means selectively connecting the second locking means to the first source of pressure to retract its locking pin from the path of the distributor piston.

References Cited in the file of this patent

UNITED STATES PATENTS

| | | |
|---|---|---|
| 851,223 | Crocker | Apr. 23, 1907 |
| 1,069,449 | Manby et al. | Aug. 5, 1913 |
| 1,495,724 | Blake | May 27, 1924 |
| 2,186,575 | Christensen | Jan. 9, 1940 |
| 2,334,326 | Hem | Nov. 16, 1943 |
| 2,340,531 | Howard | Feb. 1, 1944 |
| 2,544,734 | St. Clair | Mar. 13, 1951 |
| 2,653,560 | Bradhering | Sept. 29, 1953 |
| 2,705,607 | Inglett | Apr. 5, 1955 |
| 2,790,619 | Schachte | Apr. 30, 1957 |
| 2,797,060 | Malafarina | June 25, 1957 |
| 2,838,176 | Pettis | June 10, 1958 |